(No Model.)
J. A. FRAZIER.
VEHICLE BRAKE.
No. 561,705. Patented June 9, 1896.
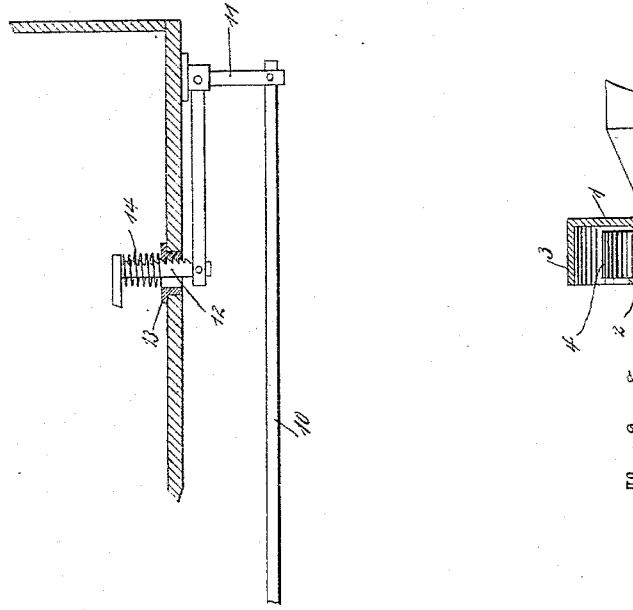
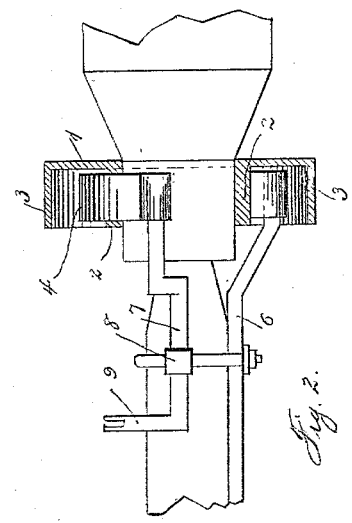
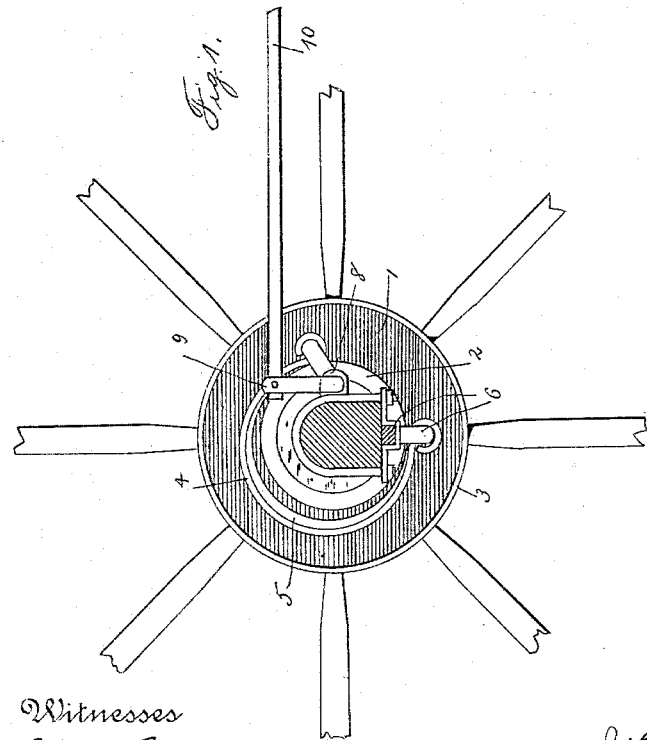
Witnesses
Grant T. Burroughs.
J. M. Shreckelmyer.
Inventor
John A. Frazier,
By his Attorneys
Finckel & Finckel.
ANDREW B. GRAHAM, PHOTO-LITHO. WASHINGTON, D.C.

UNITED STATES PATENT OFFICE.

JOHN A. FRAZIER, OF GEORGESVILLE, OHIO.

VEHICLE-BRAKE.

SPECIFICATION forming part of Letters Patent No. 561,705, dated June 9, 1896.

Application filed December 2, 1895. Serial No. 570,724. (No model.)

*To all whom it may concern:*

Be it known that I, JOHN A. FRAZIER, a citizen of the United States, residing at Georgesville, in the county of Franklin and State of Ohio, have invented certain new and useful Improvements in Vehicle-Brakes; and I do hereby declare the following to be a full, clear, and exact description of the invention, such as will enable others skilled in the art to which it appertains to make and use the same.

My invention relates to brakes that are applied and used upon the hubs of wheels.

The invention consists of an improved construction, adaptation, and combination of parts that will form an exceedingly cheap, durable, easily manipulated, and effective brake.

In the accompanying drawings, Figure 1 is a general view in side elevation illustrating the brake and its operating mechanism. Fig. 2 is a view in front elevation, the collar being in section.

1 designates a collar, which consists of a circular box-like structure having the walls 2 and 3 and a central orifice by which the collar may be placed and shrunk or otherwise secured upon the inner end of the hub. The wall 2 affords the friction-surface for the brake shoe or band, and the wall 3 protects the same against splashings of water or mud.

The brake shoe or band is formed of a curved metallic strip 4, having its inner side furnished with a leather sole or lining 5. This brake shoe or band is of such a length that when placed in the collar 1 it encircles about three-fourths of the circumference of the wall 2.

One end of the brake-band is held fixedly by the end of a rod 6, which is secured to the under side of the axle with the usual clips, the end of the rod entering an eye or loop formed on the end of the band. The free end of the brake-band is engaged by the cranked end of a rock-shaft 7, which is journaled in bearings 8, preferably formed on the clips. The inner end of the rock-shaft 7 is bent up to form an arm 9.

The drawings illustrate the apparatus on the left-hand rear wheel of a vehicle, and the apparatus on the right-hand side is a symmetrical duplicate of that described for the left-hand side. The ends of the arms 9 have pivotally attached thereto rods 10, (shown as broken,) which extend convergingly forward under the vehicle and are pivoted either directly or indirectly to the short arm of the bell-crank lever 11, which is pivoted to the under side of the forward part of the vehicle. The long horizontally-extending arm of the bell-crank lever 11 has pivotally connected to its rear extremity the shank of the foot-piece 12, which passes through a thimble 13 in the floor of the vehicle. The shank of the foot-piece is made flat and is provided with teeth at its forward side to engage teeth in the front side of the slot in the thimble 13. Placed on the shank of the foot-piece between the thimble 13 and the head of the foot-piece is a coil-spring 14, which tends to hold the foot-piece in elevated position, and consequently the friction bands or shoes released.

By pressing the foot-piece downward the rods 10 are thrown forward and the crank-arms engaging the free ends of the brake bands or shoes are thrown downward, and consequently the brakes into contact with the friction-surface 2 of the collar 1. When the desired friction is obtained, the brakes may be locked by pushing the foot-piece forward into engagement with the toothed thimble. To release the brake, the foot-piece is kicked rearwardly with the heel out of engagement with the teeth, and the coil-spring 14 will actuate the rods and levers to release the brakes.

When the leather sole of the brake is worn out, it may be easily renewed by the owner of the vehicle, no special skill being required for that purpose.

The collar 1 instead of being made as a separate structure may be formed integral and at the same time as the rim of the hub.

What I claim, and desire to secure by Letters Patent, is—

The combination with a hub provided with a collar or box-like structure 1 having the friction surface or ring 2 and the outer portion or flange 3 to surround the brake-band, the band 4, an arm 6 secured to the axle and connected with one end of the band, the cranked lever or rock-shaft 7 pivoted upon the axle and having its crank connected with the other end of the band, an arm 9 on the other end of the rock-shaft, the bell-crank lever 11, rod 10 connecting the arm 9 and bell-crank lever, the toothed foot-piece 12 connected with the bell-crank lever, the toothed thimble 13 to be engaged by the foot-piece, and the spring 14 to retract the foot-piece, all constructed and arranged substantially as shown and described.

In testimony whereof I affix my signature in presence of two witnesses.

JOHN A. FRAZIER.

Witnesses:
JAS. S. RICKETTS,
GEORGE M. FINCKEL.